United States Patent

Pearl et al.

[11] Patent Number: 5,909,788
[45] Date of Patent: Jun. 8, 1999

[54] COUPLING ASSEMBLY COMPONENT

[75] Inventors: Robert A. Pearl, Brunswick; Charles M. Imler, Concord Township, both of Ohio; Joe W. Lowry, Laurinburg, N.C.

[73] Assignee: Eaton Corporation, Cleveland, Ohio

[21] Appl. No.: 09/044,975

[22] Filed: Mar. 20, 1998

[51] Int. Cl.$^6$ .................................................. F16D 25/04
[52] U.S. Cl. .................................. 192/88 B; 192/85 AT; 188/366
[58] Field of Search ............................ 192/88 R, 88 A, 192/88 B, 85 AT; 188/366

[56] References Cited

U.S. PATENT DOCUMENTS

| 2,897,924 | 8/1959 | Fawick | 192/88 B X |
| 5,086,899 | 2/1992 | Latsko | 192/88 B |
| 5,117,957 | 6/1992 | Latsko | 192/88 B |
| 5,366,055 | 11/1994 | Pudelski et al. | 192/88 B |

*Primary Examiner*—Richard M. Lorence
*Attorney, Agent, or Firm*—Tarolli, Sundheim, Covell, Tummino & Szabo

[57] ABSTRACT

A coupling assembly includes an annular base which is connected with the first annular friction surface. An annular fluid extensible tube is disposed between the annular base and the first annular friction surface. A fitting is connected with the base and tube to conduct fluid pressure into a chamber in the tube. The fluid pressure extends the tube to press the first friction surface against the second friction surface. The fitting has a main section with a passage through which fluid pressure is conducted into the tube and a flange section which extends radially outward from the main section and is enclosed by material of the tube to retain the fitting in the tube. The main section and flange section of the fitting are integrally formed by a single piece of polymeric material. A plurality of openings are formed in the flange section and are filled with the material of the tube to interconnect the tube and the fitting.

4 Claims, 2 Drawing Sheets

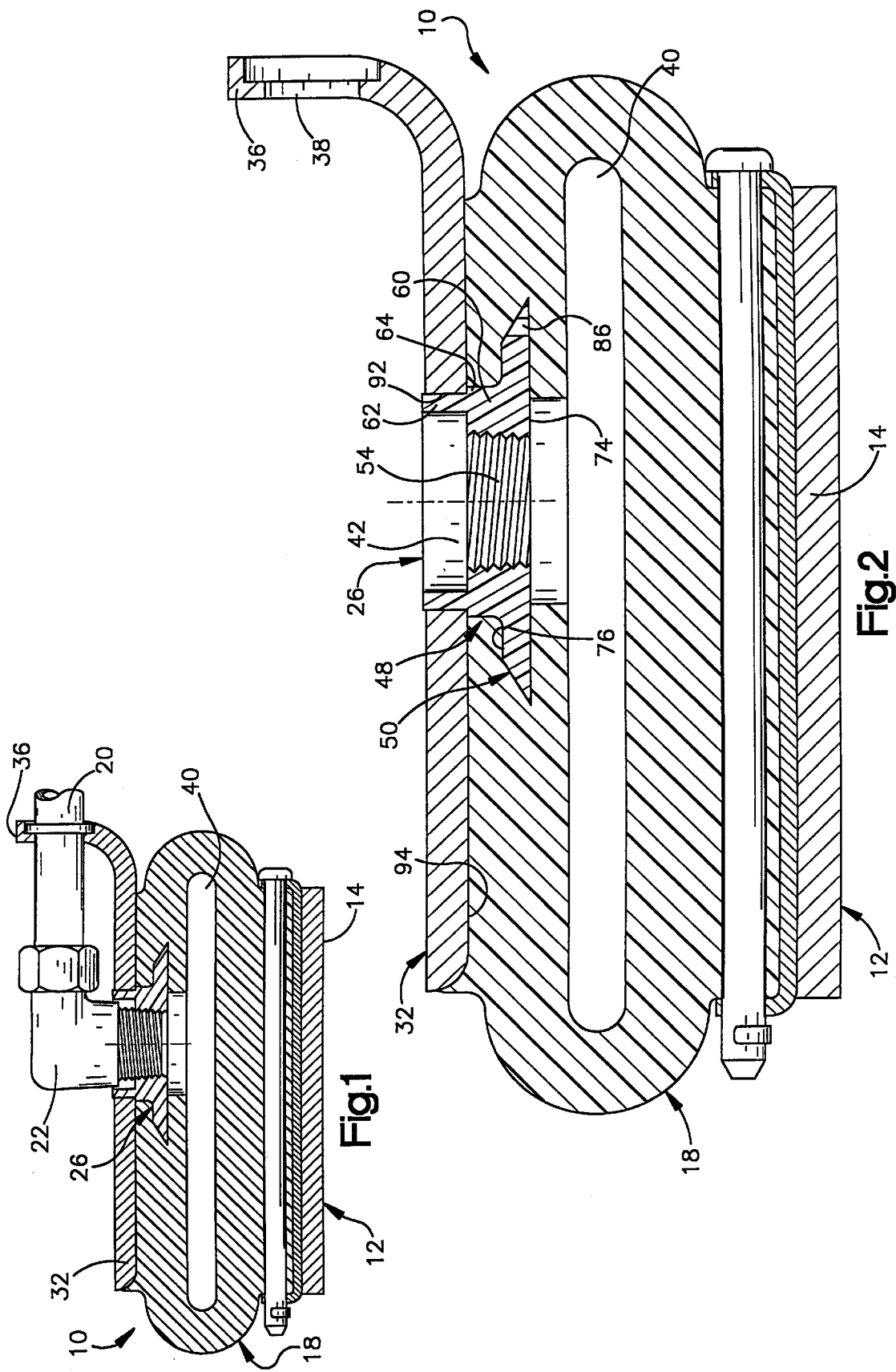

COUPLING ASSEMBLY COMPONENT

BACKGROUND OF THE INVENTION

The present invention relates to a new and improved component of a coupling assembly which may function as either a clutch or a brake between a pair of elements.

Known coupling assemblies which are used as either a clutch or a brake are disclosed in U.S. Pat. Nos. 2,897,924; 5,057,178; 5,086,899; and 5,366,055. Each of these coupling assemblies includes an annular rim or base which is connected to one of two elements between which force is transmitted. An annular array of friction shoes is engageable with a friction surface connected with the other element. An annular fluid extensible tube is disposed between the base and the annular array of friction shoes. A fitting is connected with the base and tube to enable fluid pressure to be conducted into an annular chamber in the tube. The fitting may be formed of metal and have a skirt which is formed of polymeric material and extends radially outward from the metal fitting in a manner 20 generally similar to that disclosed in U.S. Pat. No. 2,897,924.

SUMMARY OF THE INVENTION

The present invention provides a coupling assembly component for use in transmitting force between a pair of elements. The coupling assembly component includes an annular rim or base which is adapted to be connected with one of the elements. A first annular friction surface is coaxial with the base and is movable into engagement with a second annular friction surface connected with a second element. An annular fluid extensible tube is coaxial with the base. The tube is radially extensible under the influence of fluid pressure to move the first friction surface into engagement with the second friction surface. A fitting is provided to conduct fluid pressure into the tube.

In accordance with a feature of the invention, the fitting is integrally formed by a single piece of polymeric material. The fitting may have a main section with a passage which enables fluid pressure to be conducted through the fitting into the chamber in the tube. A flange section extends radially outward from the main section of the fitting and is enclosed by the material of the tube to retain the fitting in the tube.

A plurality of openings may extend through the flange section of the fitting. Each of the openings in the flange section of the fitting is filled by the material of the tube to interconnect the tube and the fitting. In one specific embodiment of the invention, the fitting was molded as one piece of polymeric material and was reinforced with fiber materials.

BRIEF DESCRIPTION OF THE DRAWINGS

The foregoing and other features of the invention will become more apparent upon a consideration of the following description taken in connection with the accompanying drawings wherein:

FIG. 1 is a fragmentary sectional view of a component of a coupling assembly;

FIG. 2 is an enlarged sectional view of a portion of FIG. 1 and illustrating the relationship between a base, a fluid extensible tube, an annular array of friction shoes, and a fitting which is constructed in accordance with the present invention and through which fluid is conducted into a chamber in the tube;

DESCRIPTION OF ONE SPECIFIC PREFERRED EMBODIMENT OF THE INVENTION

Figure 3:
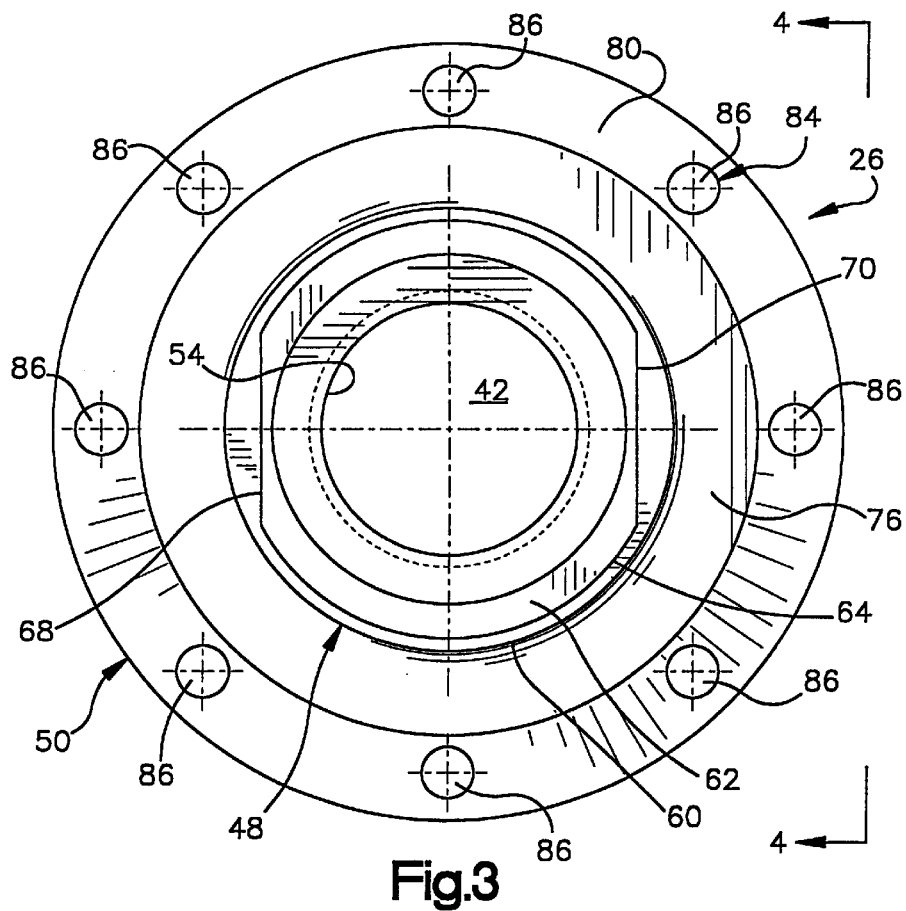
FIG. 3 is an enlarged plan view of the fitting used in the coupling assembly component of FIG. 2.

A coupling assembly component 10 (FIGS. 1 and 2) includes an annular friction surface 12 formed by an annular array of friction shoe assemblies 14. The friction shoe assemblies 14 are engageable with the outside of a cylindrical drum or second coupling component (not shown) to interconnect the two coupling components. The coupling assembly component 10 could function as part of either a brake or a clutch.

The friction shoe assemblies 14 are moved into firm engagement with the drum by radial expansion of an annular inflatable tube 18. Thus, when fluid pressure is conducted through an air tube 20 (FIG. 1) and an elbow 22 to an improved fitting 26, the tube 18 expands radially inward. This causes the tube 18 to press friction shoe assemblies 14 against a cylindrical outer side surface of the drum. The friction between the shoe assemblies 14 and drum interconnect the drum and the coupling assembly component 10 in a manner similar to that disclosed in U.S. Pat. No. 5,178,248.

In the illustrated embodiment of the invention, friction shoe assemblies 14 are pressed against the outside of a cylindrical drum. However, it is contemplated that the coupling assembly component 10 could be designed in such a manner as to press the friction shoe assemblies 14 against a cylindrical inner side surface of a hollow drum.

A rigid annular metal rim or base 32 (FIG. 2) is connected with the inflatable tube 18. The rim or base 32 has an annular mounting flange 36 having an opening 38 through which the air tube 20 (FIG. 1) extends. The annular mounting flange is used to connect the coupling component 10 with an associated apparatus. In the illustrated embodiment of the invention, the inflatable tube 18 is secured directly to the rim 32 and friction shoe assemblies 14. However, the inflatable tube 18 could be separate from the rim and friction shoe assemblies 14. If this is done, a suitable frame may be provided to position the rim 32, friction shoe assemblies 14 and tube 18 relative to each other.

Upon inflation of the tube 18, the friction shoe assemblies 14 are moved radially inward away from the rim 32 and pressed against the drum. At this time, the tube 18 transmits force between the friction shoe assemblies 14 and the rim 32. As was previously mentioned, the coupling assembly component 10 could be designed so as to move the friction shoe assemblies 14 radially outward to engage the inside of the hollow rim or second coupling component if desired.

To enable the tube 18 to be inflated, the tube has an annular chamber or cavity 40 (FIG. 2). The chamber or cavity 40 is connected in fluid communication with a source of fluid pressure (air) through the fitting 26, elbow 22 (FIG. 1), and air tube 20. The fitting 26 is connected to the annular rim 32. The fitting 26 is connected in fluid communication with the annular chamber 40 (FIG. 2) through a passage 42 which extends radially through the rim 32 and a portion of the tube 18. Although the coupling assembly component 10 could be formed in many different ways, it is believed that it may be preferred to form the coupling assembly component in the manner described in U.S. Pat. No. 5,057,178.

In accordance with a feature of the present invention, the fitting 26 is integrally formed by a single piece of polymeric material. By forming the fitting 26 of a single piece of polymeric material, construction of the fitting is facilitated. The polymeric material of the fitting 26 will not rust. The one piece molded polymeric fitting 26 is relatively inexpensive and can be molded as an integral unit.

The fitting 26 (FIGS. 3 and 4) includes a generally cylindrical main section 48 and an annular flange section 50 which extends radially outward from the main section 48 of the fitting. The main section 48 of the fitting 26 defines the passage 42 through which fluid is conducted into the chamber or cavity 40 in the tube 18 (FIG. 2) The passage 42 has an internal thread convolution 54 which engages an external thread convolution on the elbow 22 (FIG. 1).

The main section 48 of the fitting 26 includes a cylindrical base 60 (FIGS. 3 and 4) and a neck portion 62. An annular shoulder 64 interconnects the neck portion 62 and base 60. A pair of parallel flats 68 and 70 (FIG. 3) are formed on opposite sides of the neck portion 62. The flats 68 and 70 are spaced equal distances from and extend parallel to a central axis of the fitting 26.

The flange section 50 extends radially outward from the base 60. The flange section 50 includes flat parallel annular inner and outer side surfaces 74 and 76 (FIG. 4) which are disposed in a coaxial relationship with and extend radially outward from the base 60 of the main section 48. An annular rim surface 80 extends between the flat annular inner side surface 74 and the flat annular outer side surface 76 of the flange section 50. The rim surface 80 is skewed at an acute angle of between 30 and 35 degrees to the flat parallel inner and outer side surfaces 74 and 76. Of course, the rim surface 80 could be skewed at a different angle if desired.

Figure 4:
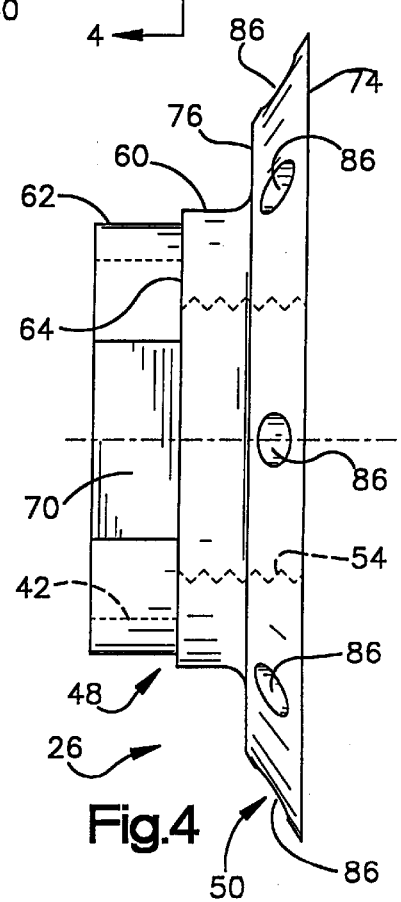
FIG. 4 is a side elevational view, taken generally along the line 4—4 of FIG. 3, further illustrating the construction of the fitting.

An annular array 84 (FIG. 3) of circular openings 86 extends through the rim surface 80 to the inner side surface 74 on the flange section 50 of the fitting 26 (FIG. 3). The annular array 84 of openings 86 is formed in a coaxial relationship with the main section 48 and rim section 50 of the fitting 26.

In accordance with one of the features of the present invention, the fitting 26 is integrally formed by a single piece of polymeric material. In the specific embodiment of the fitting 26 illustrated in FIGS. 3 and 4, the fitting is molded as one piece of polymeric material which is reinforced with polymeric fiber material, that is, fiberglass. Of course, reinforcing material having a different composition could be utilized if desired.

In the specific embodiment of the invention illustrated in FIGS. 2 and 3, the flange section 50 had an outside diameter of approximately 1.75 inches. The fitting 26 had an overall height of approximately 0.475 inches. The base 60 of the main section 48 of the fitting had a diameter of approximately 1.0 inches. In this particular embodiment of the invention, the opening 86 had a diameter of approximately 0.12 inches.

It should be understood that the foregoing specific dimensions for the fitting 26 have been set forth herein for purposes of clarity of description. It is contemplated that the fitting 26 can and will be made with many different dimensions.

The fitting 26 is embedded in the polymeric material which forms the tube 18 (FIG. 2). The neck portion 62 of the fitting 26 extends into an opening 92 formed in the rim or base 32 of the coupling assembly component 10. The opening 92 has the same configuration as the cross sectional configuration of the neck portion 62. Thus, the opening 92 has flat parallel surfaces which engage the surfaces 68 and 70 to hold the fitting 26 against rotation relative to the rim or base 32. The shoulder 64 between the neck portion 62 and base 60 abuts an annular inner side surface 94 on the rim or base 32.

The base 60 and flange section 56 are embedded in the polymeric material forming the tube 18. Thus, the outer side surfaces on the flange section 50 and the base 60 are enclosed by the material of the tube 18. The polymeric material of the tube 18 extends through each of the openings 86 in the flange section 50 to hold the fitting 26 against rotation relative to the tube 18.

Conclusion

In view of the foregoing description, it is apparent that the present invention provides a coupling assembly component 10 for use in transmitting force between a pair of elements. The coupling assembly component 10 includes an annular rim or base 32 which is adapted to be connected with one of the elements. A first annular friction surface 12 is coaxial with the base and is movable into engagement with a second annular friction surface connected with a second element. An annular fluid extensible tube 18 is coaxial with the base 32. The tube 18 is radially extensible under the influence of fluid pressure to move the first friction surface 12 into engagement with the second friction surface. A fitting 26 is provided to conduct fluid pressure into the tube 18.

In accordance with a feature of the invention, the fitting 26 is integrally formed by a single piece of polymeric material. The fitting 26 may have a main section 48 with a passage 42 which enables fluid pressure to be conducted through the fitting into the chamber 40 in the tube. A flange section 50 extends radially outward from the main section 48 of the fitting and is enclosed by the material of the tube 18 to retain the fitting in the tube.

From the above description of the invention, those skilled in the art will perceive improvements, changes and modifications. Such improvements, changes and modifications within the skill of the art are intended to be covered by the appended claims.

Having described the invention, the following is claimed:

1. A coupling assembly component for use in a coupling assembly having an annular base adapted to be connected with a first element and a first annular friction surface which is coaxial with said base and is movable into engagement with a second annular friction surface connected with a second element, said coupling assembly component comprising annular fluid extensible tube means which is extensible under the influence of fluid pressure in a chamber in said tube means to move the first friction surface into engagement with the second friction surface, and fitting means embedded in said tube means for conducting fluid pressure into the chamber in said tube means, said fitting means having a main section with a passage which extends axially through said main section to enable fluid pressure to be conducted through said fitting means into the chamber in said tube means and a flange section which extends radially outward from said main section of said fitting means and is enclosed by material of said tube means to retain said fitting means in said tube means, said main section and said flange section of said fitting means being integrally formed by a single piece of polymeric material.

2. A coupling assembly component as set forth in claim 1, wherein said flange section includes a plurality of openings which extend through said flange section, each of said openings in said flange section of said fitting means being filled by material of said tube means to interconnect said tube means and said fitting means.

3. A coupling assembly as set forth in claim 1 wherein said fitting means is integrally molded as one piece and is reinforced with fiber materials.

4. A coupling assembly component as set forth in claim 1 wherein said flange section of said fitting means has an annular configuration and includes a flat inner side surface and a flat outer side surface which extends parallel to said flat inner side surface and has an outside diameter which is less than an outside diameter of said inner side surface, said flange section has an annular rim surface which extends between and is skewed relative to said flat inner and outer side surfaces, said flange section includes a circular array of openings which extend through said flange section, each of said openings having a first end formed in said flat inner side surface and a second end formed in said rim surface.

* * * * *